Asa S. Haven
Teat sucking preventative & cattle leader.

74086

PATENTED
FEB 4 1868

Witnesses.
M. S. P. Wilde
D. W. Askins

Asa S. Haven
by J. H. Adams
Atty

United States Patent Office.

ASA S. HAVEN, OF BARRE, MASSACHUSETTS.

*Letters Patent No. 74,086, dated February 4, 1868.*

---

IMPROVEMENT IN DEVICE FOR PREVENTING COWS AND CALVES FROM SUCKING THE TEATS, AND FOR LEADING CATTLE.

---

The Schedule referred to in these Letters Patent and making part of the same.

---

Be it known that I, ASA S. HAVEN, of Barre, in the county of Worcester, and State of Massachusetts, have invented a new and improved Device for Preventing Cows and Calves from Sucking the Teats, and also for Leading Cattle, of which the following is a full, clear, and exact description, reference being had to the accompanying drawings, making a part of this specification, in which—

The object of my invention is to provide a device for preventing cows from sucking their own teats or those of other cows, and also to prevent calves from sucking, so as to enable them to be weaned at the proper time, without separating them from the dam, and also, in combination with the above, to produce a device for leading cattle; and the invention consists of a light semicircular frame, made of metal or other suitable material, to which are attached two adjustable stops or retaining-pieces, so constructed and arranged as to be readily adapted or fitted to the nostrils of a cow, calf, or other animal, and that when so adapted or fitted, upon an attempt being made by the animal to take the teat in its mouth, the teat will be pushed away by the device, so as to render it almost impossible for the mouth to gain access to the same. The invention also consists in so forming the frame as to enable it to be used for leading unruly animals, when necessary, by attaching a rope or chain to the same.

Figure 1:
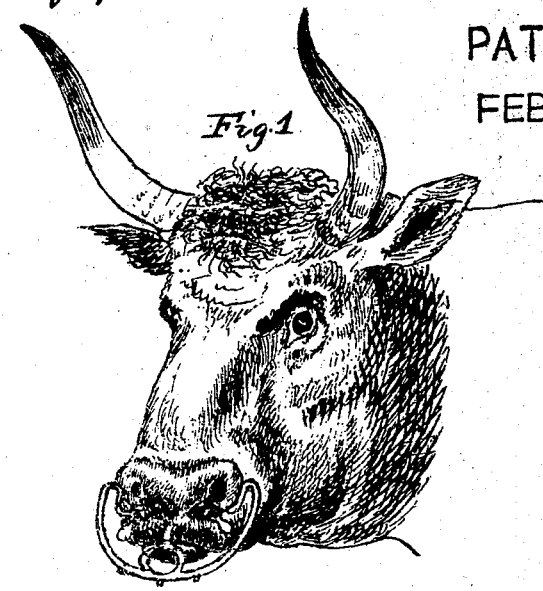
Figure 1 represents the mode of applying my device.
Figure 2:
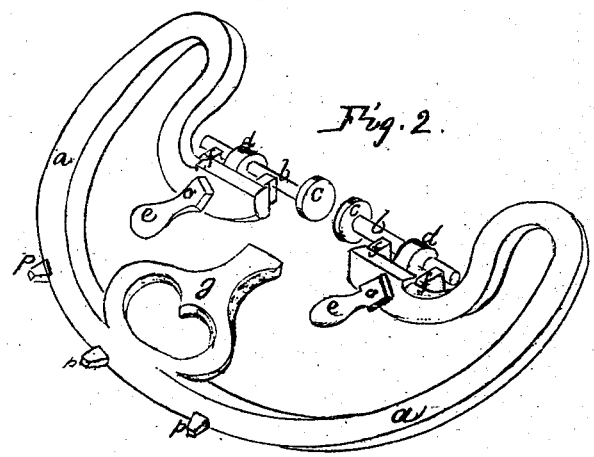
Figure 2 is a perspective view of the device.
Figure 3:
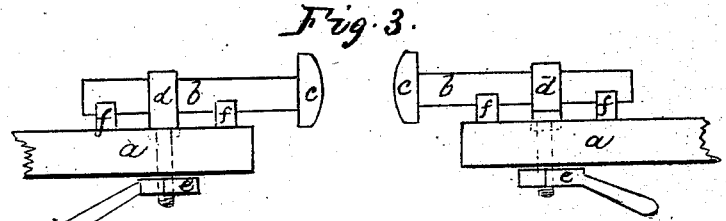
Figure 3 is a view in detail of a portion of the same, somewhat enlarged.

Referring to the drawings, $a$ represents a frame, made of metal or other suitable material, of the general form shown in fig. 2, the same being nearly semicircular, with returned ends, so as to fit each side of the mouth of the animal to which it is to be applied. On the under side of the returned ends are arranged two sliding stops or retaining-pieces, consisting of rods or bars $b\ b$, provided with enlarged or button-shaped ends $c\ c$, and fitted to slide freely in eyes $d\ d$, which are formed with a shank, that extends through the inner end of the frame $a$, the end of the shank being screw-threaded, and provided with a thumb-nut, $e$, so as to enable the eyes to be drawn up tightly. The rods $b\ b$ rest in concave bearing-pieces or saddles $f$, by which they are held in line with each other. The heads $c\ c$ of the rods $b\ b$ are designed to be attached to the cartilage that supports the nostrils of an animal, against which they are firmly pressed, being slid through the eyes $d\ d$, and held securely in position by screwing up the thumb-nuts $e\ e$. Pointed projections, $p\ p\ p$, may be attached to or formed on the front part of the frame $a$, so as to prick the udders of the cow when approached, and cause her to move away. At the front portion of the frame $a$ is an eye, $g$, to which a rope may be attached, when the device is used to lead a bull, ox, or any unruly animal.

It is frequently the case that a cow is rendered valueless as a milk-producer from the habit of sucking her own teats, and sometimes cows will suck the teats of others, thus causing a loss of milk to the farmer; and when a calf is to be weaned, it is necessary to separate it from its dam, causing additional expense and care to the farmer. Attempts have been made to obviate these difficulties by attaching an instrument provided with sharp-pointed projections, which is objectionable on many accounts. By my invention, a light, effective, and easily-applied instrument is provided, which does not interfere with the animal's feeding, and effectually accomplishes the object desired.

I do not confine myself to the exact shape of the device as above described, as it may be varied if desirable, nor to the method of securing the stops or retaining-pieces $b\ c$ in place, as cams or other devices may be used; but having thus described my invention,

What I claim as new, and desire to secure by Letters Patent, is—

1. The frame $a$, in combination with the adjustable stops or retaining-pieces $b\ c$, substantially as and for the purpose set forth.

2. I claim the eye $g$, in combination with the frame $a$, substantially as and for the purpose described.

In testimony whereof, I have signed my name to this specification in the presence of two subscribing witnesses.

ASA S. HAVEN.

Witnesses:
J. H. ADAMS,
SHERMAN R. NYE.